United States Patent
Baugher et al.

[11] Patent Number: 6,029,591
[45] Date of Patent: Feb. 29, 2000

[54] MATERIAL DEPOSITION APPARATUS FOR A PLANTING UNIT

[76] Inventors: Roger Dale Baugher; Garreth Dean Baugher, both of P.O. Box 79-A, McClure, Ill. 62957

[21] Appl. No.: 09/145,875

[22] Filed: Sep. 3, 1998

[51] Int. Cl.$^7$ .............................. A01C 5/06; A01C 7/20
[52] U.S. Cl. .......................................... 111/153; 111/163
[58] Field of Search .................................... 111/164, 153, 111/170, 189, 165, 163

[56] References Cited

U.S. PATENT DOCUMENTS

| | | | |
|---|---|---|---|
| 1,857,749 | 5/1932 | White | 111/164 X |
| 3,658,018 | 4/1972 | Connor | 111/164 |
| 4,009,668 | 3/1977 | Brass et al. | 111/164 X |
| 4,031,834 | 6/1977 | Klenke . | |
| 4,196,679 | 4/1980 | Moore . | |
| 4,423,788 | 1/1984 | Robinson, Jr. et al. | 111/164 X |
| 4,570,554 | 2/1986 | Clark . | |
| 4,653,410 | 3/1987 | Typpi . | |
| 4,714,033 | 12/1987 | Neumeyer . | |
| 4,760,806 | 8/1988 | Bigbee et al. . | |
| 4,796,550 | 1/1989 | Van Natta et al. . | |
| 4,883,126 | 11/1989 | Leland . | |
| 5,427,038 | 6/1995 | Ege | 111/164 X |
| 5,595,130 | 1/1997 | Baugher et al. | 111/164 X |
| 5,678,500 | 10/1997 | Schmidt | 111/164 |

OTHER PUBLICATIONS

7500 Series Grain Drill Operator's Manual, John Deere Des Moines Works, 1992.
Great Plains Product Catalog, Great Plains Manufacturing, Inc. (No Date).
Tye 2000 Notill Systems Catalogs, Tye Company, 1994.
Tye Folding Drills, Type Company, Product Brochure, 1990.
Crustbuster All–Plant Drill, CrustBuster Speed King, Inc., Product Brochure.
Crustbuster Procision 4000 Section Grain Drill, CrustBuster Speed King, Inc., Product Brochure, 1994.
Grain Drill, Case International, Product Brochure (No Date).
Planting & Seeding, Case International, Product Brochure, 1994.
Premier 1575 No Till Drill, Duratech Industries International, Inc., Product Brochure (No Date).
No–Till Grain Drill, Krause Corporation, Product Brochure, 1994.
Grain Drills, Krause, Product Brochure (No Date).
No–Till and Conventional Grain Drills, Marliss Division, Sukup Manufacturing Company (No Date).
John Deere Drills Catalogs (No Date).

(List continued on next page.)

*Primary Examiner*—Christopher J. Novosad
*Attorney, Agent, or Firm*—Haverstock, Garrett & Roberts

[57] ABSTRACT

Apparatus adapted for use with a disk type planting unit or opener assembly for depositing material in a furrow formed in the ground thereby. The disk type planting unit or opener assembly includes a disk supported for forward movement through the ground for forming the furrow, the disk being oriented at a small acute angle with respect to the forward direction and having a generally rearwardly facing disk surface. The apparatus includes a material delivery member having an inlet opening for receiving the material, a lower portion having an outlet opening for depositing the material into the furrow, and a conduit for the passage of the material between the inlet opening and the outlet opening. The apparatus further includes a runner extending forwardly from the material delivery member adapted to be located in the furrow in a steady state position wherein a lower portion thereof is positioned beside the rearwardly facing surface of the disk, for keeping loose soil from entering the furrow in advance of the material deposited therein. A support member extends forwardly from the runner for mounting the runner and the material delivery member to the planting unit or opener assembly at a forward location, such that during the forward movement, the runner will be urged by the support member toward the steady state position.

27 Claims, 5 Drawing Sheets

OTHER PUBLICATIONS

Barton No Till Disk Seedindg SYstem Brochure, Barton No Till Disk Seeding System Mfg. Inc., 2 pp., no date.

Barton No Till Disk, Inc. Seeding System Brochure, Barton No Till Disk Seeding System Inc., 2 pp., no date.

Article, Angled Disk Openers Cut Through Straw and Hard Soil, Oct., 1994 Grain News, 1 page.

The Future in Seeding Tor–Master the Revolutionary Air Drill brochure, Tor–Master Mfg. Ltd., 2 pp., no date.

New No–Till Disk Seeding System, Farm Show, vol. 18, No. 4, 1994, 2 pp.

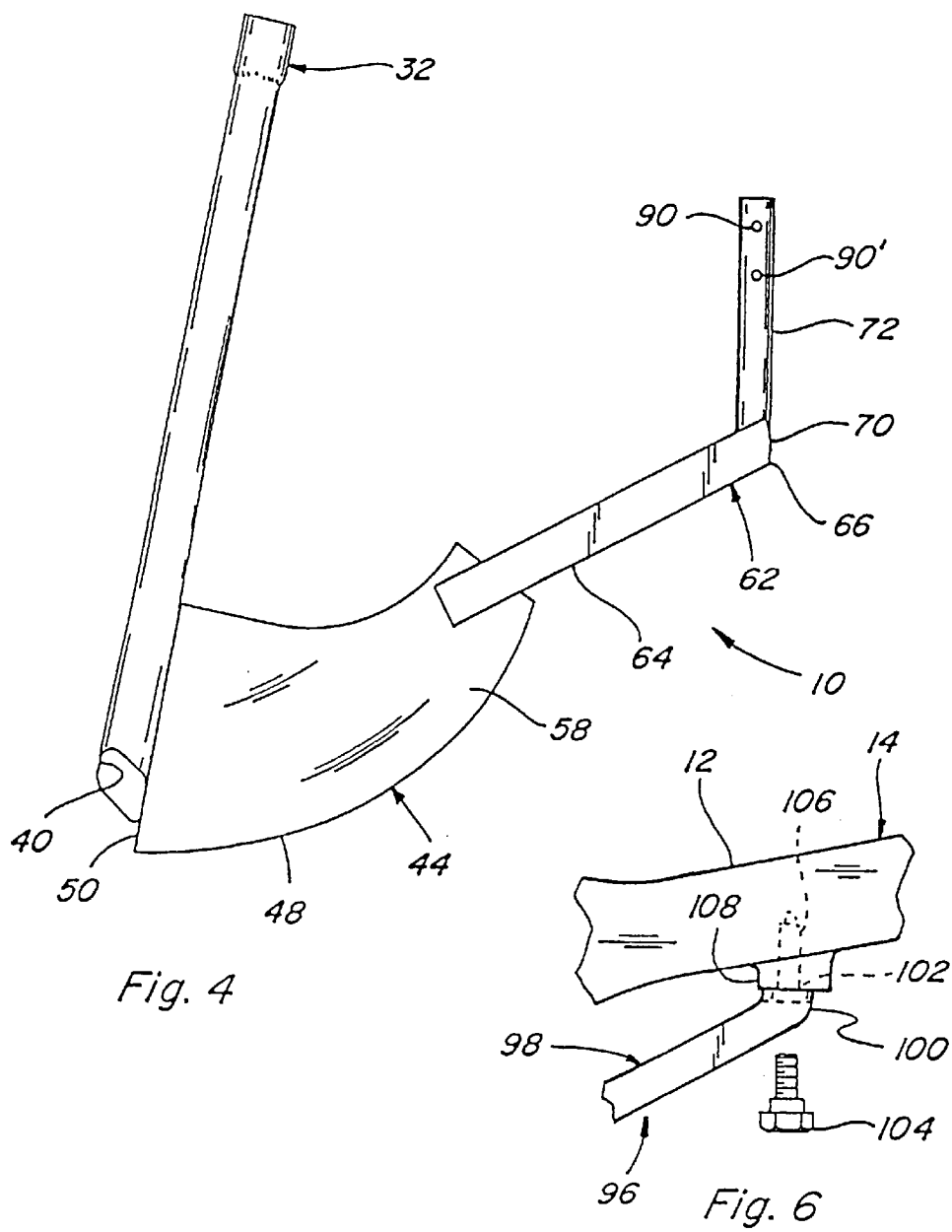
Fig. 4
Fig. 6
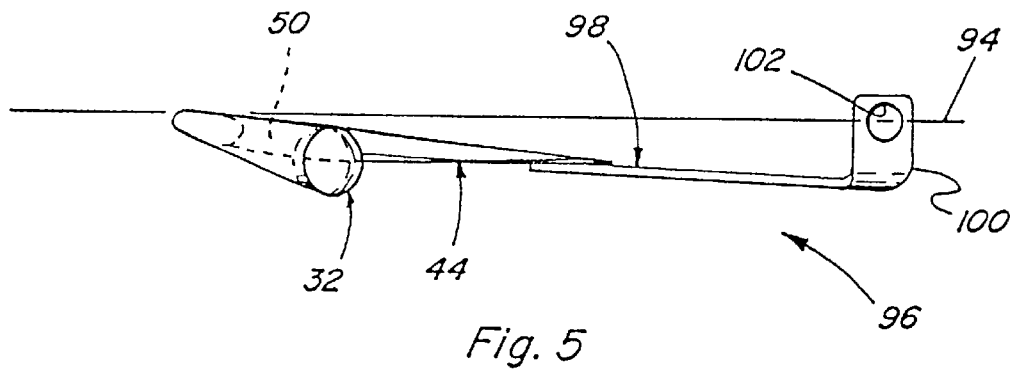
Fig. 5

MATERIAL DEPOSITION APPARATUS FOR A PLANTING UNIT

The present invention relates generally to apparatus for depositing material such as seeds, fertilizer, and the like in a trench or furrow formed in the ground, and more particularly, to a material deposition apparatus for use in association with a disk type opener or planting unit, which deposition apparatus has a self-aligning capability for maintaining a runner thereof in a steady state position beside the disk while moving forwardly through the furrow.

BACKGROUND OF THE INVENTION

Currently, a wide variety of devices are used for depositing seeds, fertilizer and other materials in trenches and furrows formed in the ground by disk type opener and planting units, under a wide variety of soil, tillage and moisture conditions. Such varying conditions include rocky soil conditions, lightly tilled conditions wherein large dirt clods and some intact plant residue is present, and minimum till conditions wherein standing weeds, remaining plant structure, and other trash and debris are present. Under all of the above discussed conditions items such as rocks, dirt clods, and plant residues encountered in the furrow can operate to urge the material deposition apparatus of the planting unit away from the disk so as to interfere with the operability thereof to place material such as seed, fertilizer and the like in a desired position in the furrow. Additionally, in many instances the material deposition apparatus serves as a scraper for removing mud and other material from the disk, and when spaced from the disk, is not operable to perform that function. Still further, the rocks, dirt clods, plant residue, soil and other debris can become lodged between the disk and the material deposition apparatus when spaced therefrom, thereby requiring stoppage of the planting operation for removal.

To mitigate the above discussed problems, many known planting units and openers utilize a spring or other resilient biasing member to urge the material deposition apparatus against the disk. However, it has been found that dirt, dust, plant matter and the like can accumulate on, in and around such springs and other biasing members thereby interfering with their operation, as well as the operation of the material deposition apparatus itself. Such springs and other biasing members can also break and be lost.

One attempted solution to this problem has been to increase the force applied by the spring or other biasing member to urge the material deposition apparatus against the disk. However, it has been found that when such greater forces are used, the material deposition apparatus can operate like a brake to slow and even stop the rotation of the disk resulting in a plowing effect instead of the desired opening. Higher forces can also result in faster wear of the portions of the material deposition apparatus in frictional contact with the disk and the disk itself.

Accordingly, the present invention is directed to overcoming one or more of the problems as set forth above.

SUMMARY OF THE INVENTION

Apparatus adapted for use with a disk type planting unit or opener assembly for depositing material in a furrow formed in the ground thereby is disclosed. The disk type planting unit or opener assembly includes a disk supported for forward movement through the ground for forming the furrow, the disk being oriented at a small acute angle with respect to the forward direction and having a generally rearwardly facing disk surface. The apparatus includes a material delivery member having an inlet opening for receiving the material, a lower portion having an outlet opening for depositing the material into the furrow, and a conduit for the passage of the material between the inlet opening and the outlet opening. The apparatus further includes a runner extending forwardly from the material delivery member adapted to be located in the furrow in a steady state position wherein a lower portion thereof is positioned beside the rearwardly facing surface of the disk, for keeping loose soil from entering the furrow in advance of the material deposited therein. A support member extends forwardly from the runner for mounting the runner and the material delivery member to the planting unit or opener assembly at a forward location, such that during the forward movement, the runner will be urged by the support member toward the steady state position.

According to a preferred embodiment of the present invention, the support member comprises an arm having an elongated arm portion extending forwardly from the runner to a shorter arm portion extending sidewardly to a mounting portion adapted for connection to a portion of the opener assembly located adjacent a forwardly located edge portion of the disk.

BRIEF DESCRIPTION OF THE DRAWINGS

FIG. 4 is a side view of the apparatus of FIG. 1;

FIG. 5 is a top view of another embodiment of material deposition apparatus according to the present invention;

FIG. 6 is a fragmentary side view of the apparatus of FIG. 5, showing connection thereof to the opener assembly of FIG. 1;

BEST MODE FOR CARRYING OUT THE INVENTION

Figure 1:
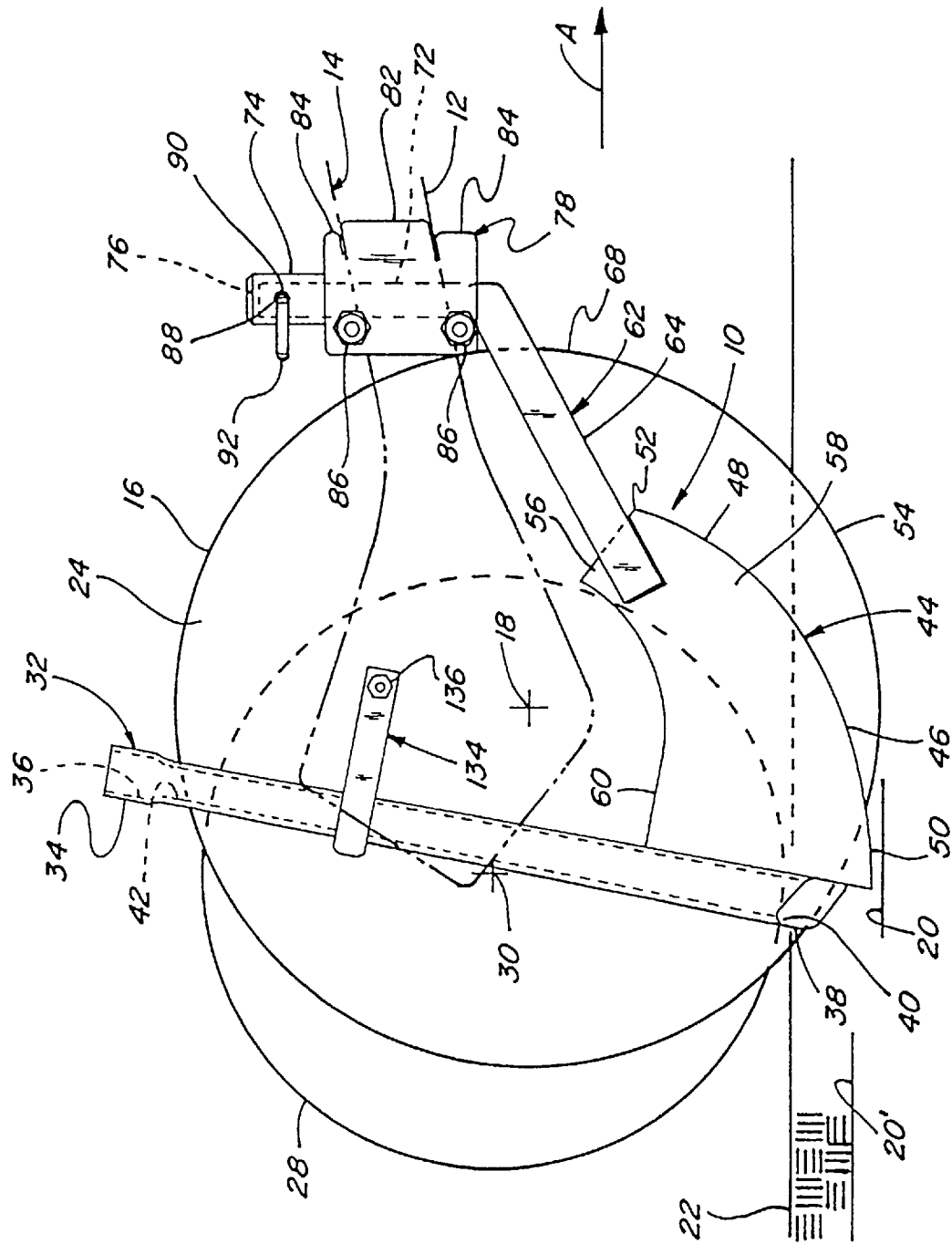
FIG. 1 is a fragmentary side view of one embodiment of material deposition apparatus according to the present invention shown in association with a single disk opener assembly.
Figure 3:
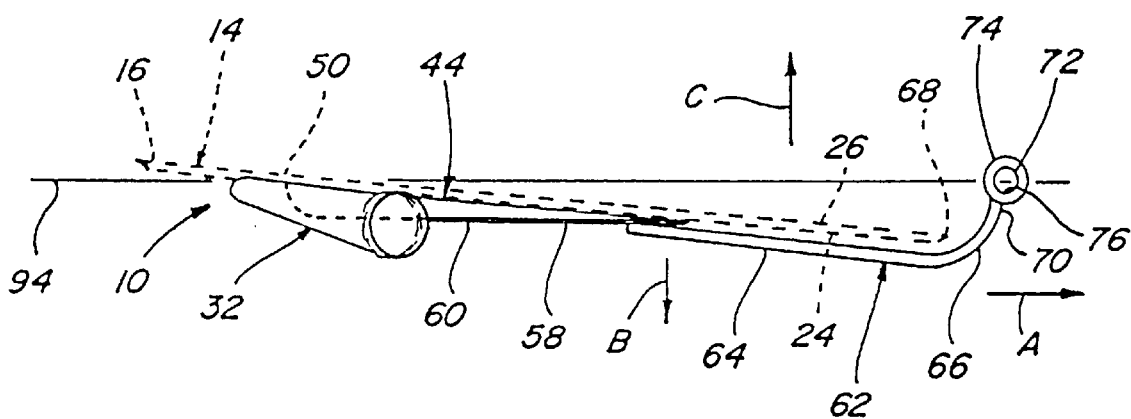
FIG. 3 is a top view of the apparatus of FIG. 1 showing the relationship of a runner thereof to the disk of the opener assembly (in phantom) in a steady state position.

Referring to the drawings by reference numbers, wherein like numerals refer to like parts, the number 10 in FIG. 1 refers to material deposition apparatus constructed and operable according to the teachings of the present invention. Apparatus 10 is shown mounted to an arm 12 of an opener assembly 14. Opener assembly 14 is representative of a wide variety of commercially available opener assemblies operable for forming a furrow or trench in the ground as the opener assembly is moved in a forward direction as represented by the arrow A, including our opener assemblies as disclosed and explained in our U.S. Pat. No. 5,595,130, the specification of which is hereby incorporated herein by reference. Briefly, opener assembly 14 includes the arm 12, which comprises a portion of a draw bar assembly operable for connection to a tool bar of an implement or other member (not shown) for towing the opener assembly forwardly over the ground as denoted by the arrow A; and a disk 16 supported by arm 12 for rotation about a disk axis 18 oriented at a small acute angle with respect to the forward direction denoted by the arrow A for forming a generally V-shaped furrow 20 in ground 22. By virtue of the angular orientation of disk 16 with respect to the forward direction denoted by the arrow A, disk 16 has a generally rearwardly facing disk surface 24 and an opposite forwardly facing disk surface 26, as best shown in FIG. 3. Opener assembly 14 further includes a gauge wheel 28 mounted for rotation about a gauge wheel axis 30 through an adjusting mechanism (not shown) connected to arm 12 to allow adjusting the depth of penetration of disk 16 into the ground for varying the depth of furrow 20, as illustrated by the furrow 20'. Here, it should be noted that although apparatus 10 is shown in association with opener assembly 14 which is more commonly known as a single disk opener assembly, it should be recognized and understood that apparatus 10 likewise has utility for use with a wide variety of other opener assemblies having one or more disks, as desired.

Apparatus 10 includes a material delivery member 32 of rigid, tubular construction including an upper end 34 having an inlet opening 36, an opposite lower end 38 having an outlet opening 40, and a conduit 42 extending through member 32 in communication with inlet opening 36 and outlet opening 40. Briefly, upper end 34 of member 32 is adapted for connection in material receiving communication with one end of a material conveying tube, hose or the like (not shown) the opposite end of which is connected in communication with a container (not shown) for containing a quantity of the material to be deposited into the furrow. Here, it should be understood that the subject material can include seed, beans, fertilizer, chemicals, and other substances typically desired to be deposited into a furrow. It should also be recognized and understood that outlet opening 40 can be positioned at any desired location with respect to furrow 20 for depositing the material into the furrow, as required for a particular application.

Apparatus 10 further includes a runner 44 connected to and extending forwardly from lower end 38 of material delivery member 32. Runner 44 has a lower portion 46 adapted to be located in furrow 20 in a steady state position closely beside rearwardly facing disk surface 24 for keeping soil from entering furrow 20 in advance of the material deposited therein by material delivery member 32. Runner 44 includes a leading edge portion 48 having an arcuate shape which extends from a lowermost and rearward most portion 50 of lower portion 46 of runner 44 to an uppermost and forwardmost portion 52 of the runner. Here, it should be noted and understood that lowermost and rearwardmost portion 50 is shown located a small distance behind and beneath a circumferentially extending outer peripheral edge 54 of disk 16, but could likewise be positioned more closely or completely beside rearwardly facing disk surface 24, as desired for a particular application. In either instance, in the steady state position that portion of leading edge portion 48 of the runner which is located beside rearwardly facing disk surface 24 is most preferably in intimate contact with the rearwardly facing disk surface. This intimate contact is important as it allows leading edge portion 48 to scrape and clean mud, sticky soil and other substances from rearwardly facing disk surface 24 as it rotates, and it tends to divert most solid items, such as rocks, dirt clods, plant residue, and the like away from the interface between runner 44 and rearwardly facing disk surface 24. In this regard, runner 44 can also include an optional upper edge 56 also in intimate contact with rearwardly facing disk surface 24 for scraping and cleaning more radially inwardly located portions of rearwardly facing disk surface 24 during the rotation thereof.

Figure 2:
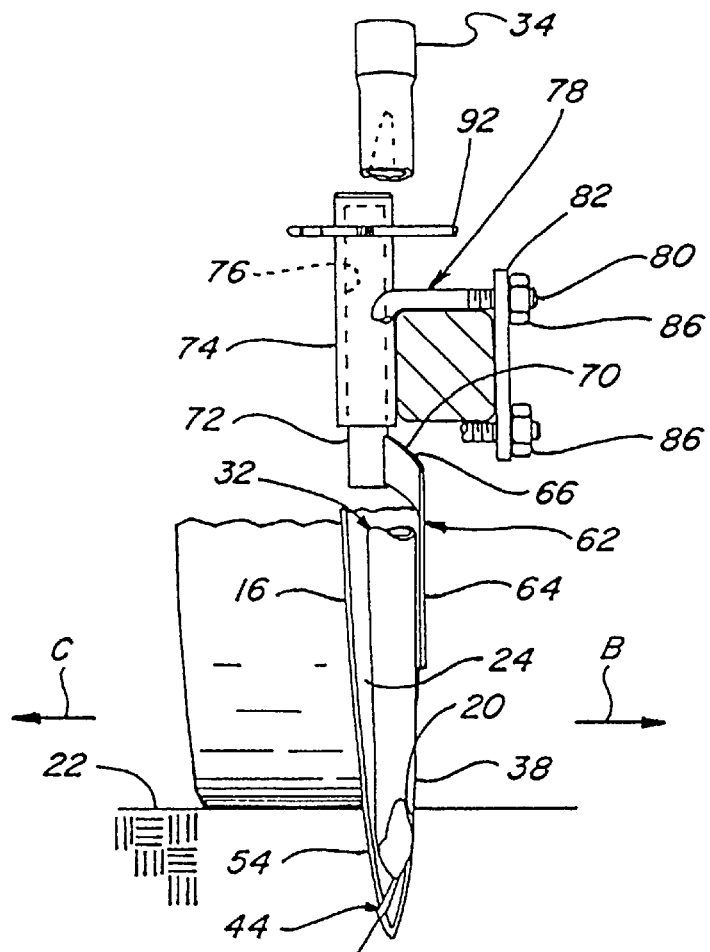
FIG. 2 is a fragmentary rear view of the apparatus and single disk opener assembly of FIG. 1.

Referring also to FIGS. 2 and 3, runner 44 includes an outer surface 58 opposite rearwardly facing disk surface 24 which extends sidewardly (denoted by the arrow B in FIGS. 2 and 3) and generally rearwardly with respect to the forward direction A away from leading edge portion 48 and terminating at an upper edge portion 60 (FIGS. 1 and 3). As mentioned above, furrow 20 has a generally rounded V-shape when viewed from front to rear or from rear to front, as best shown in FIG. 2. This rounded V-shape is imparted to the furrow by disk 16 and corresponds to the profile shape of the disk, also known as the disk shadow, which is defined by the outer peripheral edge 54 of the disk when viewed from the rear. Outer surface 58 of runner 44 preferably has a profile shape when viewed from the rear which largely conforms to and is generally no larger than the corresponding portion of the disk profile, so as to be located within the disk profile and such that the runner effectively substantially occupies that portion of the furrow forward of lower end 38 of material delivery member 32. Having runner 44 substantially occupy that portion of furrow 20 located forwardly of the material delivery member has been found to be advantageous as it operates to keep soil, particularly loose soil, on the adjacent side of the furrow from entering the furrow in advance of the material deposited therein by the material delivery member. Also, the runner is able to move forwardly through the furrow with only minimal contact with the side of the furrow, such that the runner does not significantly firm or form the furrow, and such that the runner generates only minimal drag forces in opposition to the forward movement. Furthermore, to facilitate locating lower end 38 of material delivery member 32 in desired lower positions within furrow 20 without contacting the side of the furrow, lower end 38 of the member 32 is preferably compressed or otherwise reduced in sideward dimension compared to upper end 34, so as to also be within the disk profile.

To obtain the advantages just described, it is desirable for leading edge portion 48 to be biased against disk surface 24. However, it is contemplated that it will be desirable in some instances for runner 44 to move away from disk surface 24 to allow the passage of solid items, such as rocks, dirt clods, plant residue and the like between the runner and the disk surface. In this regard, while it is desirable to allow such solid items encountered in the path of the opener assembly to pass between the runner and the rearwardly facing disk surface, it has been found that it is not desirable to allow softer, more liquidus materials, particularly mud, to pass therebetween, as it has been observed that the mud will harden on the disk surface and eventually build up to a thickness which interferes with the operation of the opener assembly.

To complicate the application of the seemingly simple solution to the above described problems, namely, utilization of a spring or other biasing member to urge the runner against the disk, it has been found that if an insufficient biasing force is applied, the troublesome liquidus material such as mud is able to accumulate on the disk. In contrast, if a greater biasing force is applied, it has been found that insufficient passage of solid items is allowed between the disk and the runner, the force can slow or stop the disk so as to cause the disk to plow and otherwise function improperly, and the runner as well as the disk have been found to wear out prematurely due to the substantial frictional forces created between the disk and the runner by the biasing forces.

To overcome the aforementioned problems, apparatus 10 includes a support member 62 connected to runner 44 and extending forwardly therefrom for mounting runner 44 and material delivery member 32 to opener assembly 14. The preferred support member 62 is an arm including an elongated arm portion 64 which extends forwardly and upwardly to a forwardmost located elbow 66 located forwardly of a forward portion 68 of outer peripheral edge 54 of disk 16, and a shorter arm portion 70 which extends sidewardly from elbow 66 in a direction toward disk 16, denoted by the arrow C in FIGS. 2 and 3, past forward portion 68 of the disk and terminating at a mounting portion which is a generally vertically extending pin 72. Pin 72 is cooperatively and rotatably receivable in a correspondingly shaped cavity 76 of a bushing 74. Bushing 74 is in turn mounted to arm 12 of opener assembly 14 by a clamp assembly 78.

Clamp assembly 78 includes a U-bolt 80 of conventional construction having spaced, threaded ends which is welded or otherwise attached to bushing 74, a locating plate 82 having holes positioned for receiving the threaded ends of U-bolt 80, locating fingers 84 on plate 82 adapted for cooperative engagement with arm 12 for properly positioning locating plate 82 on arm 12, and conventional nuts 86 threadedly engageble with U-bolt 80 as shown for securing bushing 74 to arm 12.

Bushing 74 further includes aligned holes 88 therethrough communicating with cavity 76, and pin 72 includes a corresponding hole 90 therethrough, which holes 88 and 90 can be aligned for receiving a locking pin 92 for holding pin 72 in position in bushing 74 for maintaining apparatus 10 in the position shown. Locking pin 92 can be marginally smaller in diameter than holes 88 and/or hole 90, or otherwise loosely fitted in the holes, to allow a desired limited range of rotation of pin 72 in bushing 74, to allow runner 44 and material delivery member 32 to pivot or move sidewardly in the direction B, away from rearwardly facing disk surface 24, and also in the opposite direction C back toward the disk. Additionally or alternatively, support member 62 can be resiliently flexible sidewardly to a desired extent to allow limited sideward movement of runner 44 and material delivery member 32.

Here, it has been observed that opposing sideward forces acting on runner 44 tend to be concentrated on lowermost and rearwardmost portion 50 which is the portion of the runner located lowest in the furrow and also is that portion of the runner which can extend below and/or rearwardly of edge 54 of disk 16 (FIG. 1) as mentioned above, so as to be exposed to sideward forces from contact with soil and the like emanating from the side of the furrow adjacent forwardly facing disk surface 26, as well as forces emanating from contact with the side of the furrow adjacent rearwardly facing disk surface 24. By locating pin 72 on support member 62 at a location on, or slightly on the disk side of, forwardly to rearwardly extending center line 94 which passes through lowermost and rearwardmost portion 50 of the runner, when lower portion 46 of the runner is located in the steady state position closely beside disk 16, it has been found that support member 62 will operate to maintain the runner in the steady state position, and urge it back to the steady state position when forced away therefrom, such as by contact with rocks, plant matter, etc., encountered during the forward movement. In particular, it has been found through extensive experimentation that by closely aligning pin 72 forwardly to rearwardly with the rearmost edge of portion 50 with the runner in a steady state position with leading edge portion 48 thereof in gently biased but mostly full contact with rearwardly facing disk surface 24, this position can be maintained substantially throughout the forward movement, such that virtually no stoppage of the rotation of disk 16 and/or wear on either the runner or the disk is observed. Also, with this alignment little or no mud build-up has been observed on disk surface 24 under moist conditions, and most rocks, dirt clods, plant matter and the like are deflected by the runner away from the disk and do not pass between the runner and the disk.

Turning to FIG. 4, apparatus 10 is shown alone, including material delivery member 32, outlet opening 40 thereof; runner 44, leading edge portion 48, lowermost and rearwardmost portion 50, and outer surface 58 thereof; and support member 62, including elongated arm portion 64, elbow 66, shorter arm portion 70, and pin 72 thereof. Hole 90 through pin 72 is shown, along with an optional hole 90' therethrough, which can be used in the above described manner in the alternative to hole 90 to allow varying the height of apparatus 10 relative to opener assembly 14.

Here, it should be understood that a wide variety of structures can be utilized for mounting apparatus 10 to opener assembly 14, including, but not limited to, the following additional embodiments.

Referring to FIG. 5, another material deposition apparatus 96 constructed and operable according to the present invention is shown, like parts of embodiment 96 and apparatus 10 being identified by like numerals. Embodiment 96 includes a material delivery member 32 and a runner 44 as described above. Embodiment 96 includes a support member 98 attached at a forward location to runner 44 by welding or the like. Support member 98 is a generally rigid member which extends forwardly from runner 44 and has a forwardly located mounting portion 100 for mounting to arm 12 of opener assembly 14 for sideward pivotal movement relative thereto, including a hole 102 adapted for receiving a threaded bolt 104 threadedly receivable in a threaded hole 106 in a mounting boss 108 on arm 12. Arm 12 can be of wrought or cast metal construction, and mounting boss 108 can be welded or otherwise fastened to arm 12, or cast in place thereon, as desired. Here, hole 102 on mounting portion 100 of embodiment 96 and threaded hole 106 on arm 12 are positioned so as to be located on, or on the disk side of, the forwardly to rearwardly extending center line 94 passing through lowermost and rearwardmost portion 50 of runner 44, to achieve the advantages set forth and discussed hereinabove.

Figure 7:
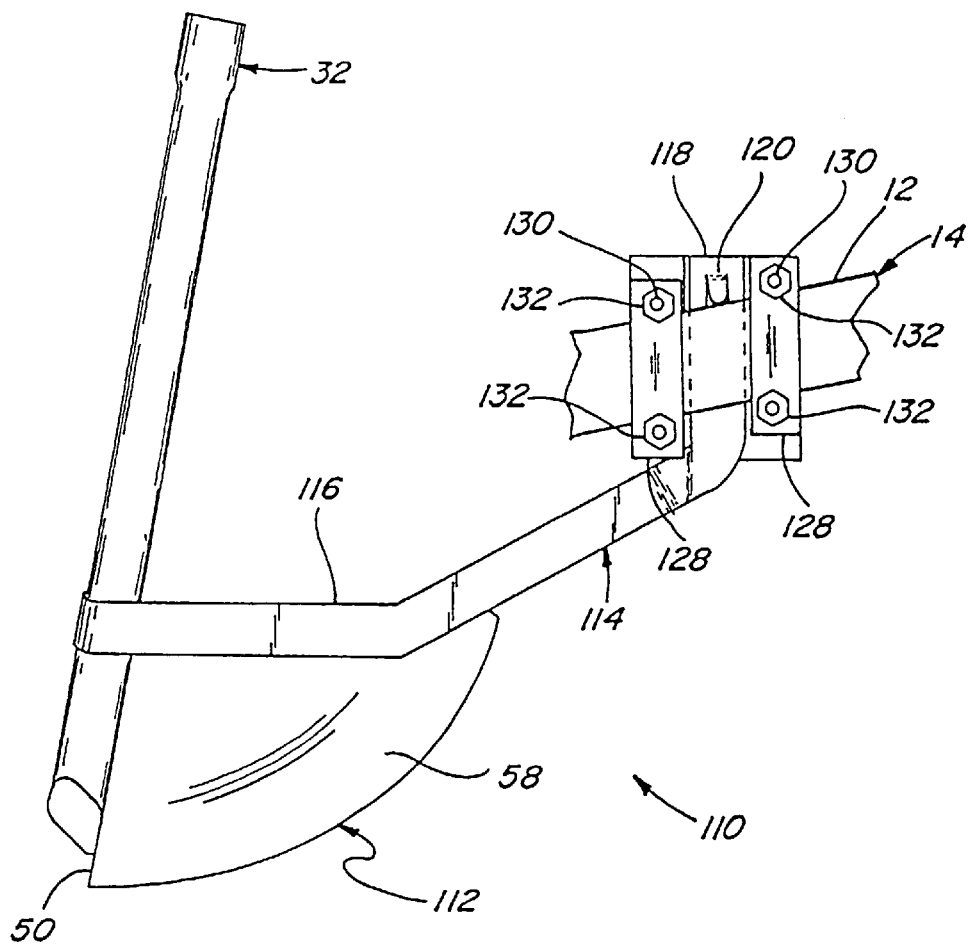
FIG. 7 is a fragmentary side view of still another embodiment of material deposition apparatus according to the present invention shown mounted to an arm portion of a typical opener assembly.
Figure 8:
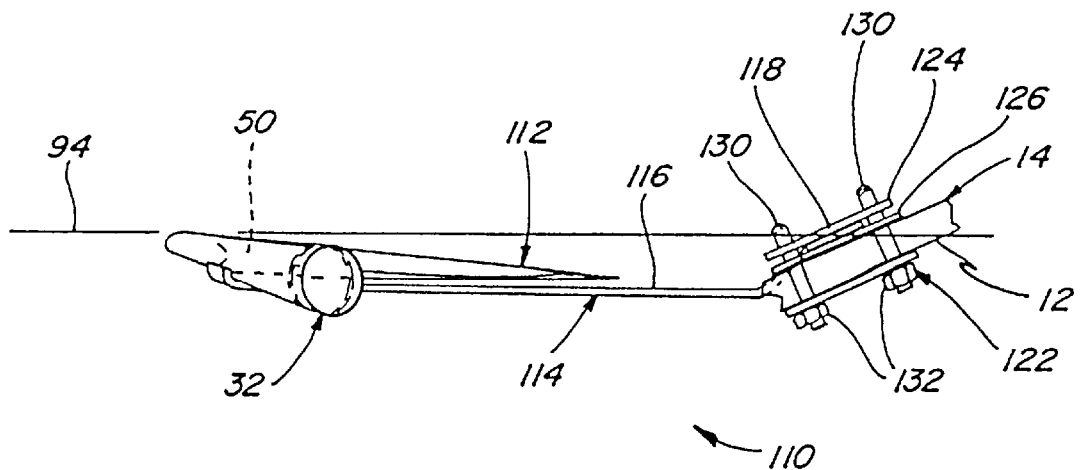
FIG. 8 is a fragmentary top view of the apparatus of FIG. 7.

FIGS. 7 and 8 show still another embodiment 110 of material deposition apparatus constructed and operable according to the teachings of the present invention, like parts of apparatus 110 and apparatus 10 and 96 being identified by like numerals. Embodiment 110 includes a material delivery member 32 as described above, but a different runner 112 which is made from a polymeric material. Runner 112 includes a leading edge portion 48, a lowermost and rearwardmost portion 50 and an outer surface 58 operable as explained above. Apparatus 110 further includes a support member 114 having an elongated arm portion 116 of metallic construction which is welded or otherwise attached to material delivery member 32 and extends forwardly therefrom and forwardly and upwardly from runner 112 to a mounting portion 118. Mounting portion 118 is mountable to arm 12 of opener assembly 14 at a location on or just on the disk side of the forward to rearward center line 94 extending through lowermost and rearwardmost portion 50 of runner 112. Mounting portion 118 includes a tab 120 engageable with an upper surface of arm 12 and is mounted thereto using a clamp assembly 122. Clamp assembly 122 includes clamping plates 124 and 126 engageable with opposite surfaces of mounting portion 118, backing plates 128 located on the opposite side of arm 12, and U-bolts 130 which pass through holes in clamping plates 124 and 126 and backing plate 128 and which are secured in position to clamp clamping assembly 122 and mounting portion 118 to arm 12 as shown with nuts 132 threadedly engaged with the U-bolts. Here, although mounting portion 118 is not pivotally mounted to arm 12 as in the above embodiments, support member 114 is of sufficient resilient flexibility in the sideward direction to allow sideward movement of runner 112 in a similar manner to that described with regard to runner 44 hereinabove.

Here, it should be noted and understood that the location for mounting apparatus 10, 96, and/or 110 to arm 112 of opener assembly 14 can be selected so as to be in alignment with the location on runner 44 where sideward forces are concentrated or greatest, in the above embodiments this being lower and rearwardmost portion 50, such that runner 44 is normally neither biased toward or away from disk 16, and that by positioning the mounting portion more toward the disk side of the region wherein the sideward forces are greatest, runner 44 will be biased at least somewhat toward the disk, the biasing force applied increasing generally proportionally as the mounting location is moved more in the disk direction. In this regard, support members 62, 98 and 114 can be constructed so as to be resiliently flexible to a desired extent in the sideward direction so as to be generally constantly biased toward the disk.

As an alternative, for use for instance wherein the mounting portion is located more in alignment with the region where sideward forces are more concentrated, an optional biasing member 134 (FIG. 1) of spring steel or other resiliently flexible material can be provided for maintaining runner 44 closely adjacent disk 16. Here, biasing member 134 is shown mounted to arm 12 of opener assembly 14 in position for applying a light biasing force against material delivery 32 in the direction of the disk, biasing member 134 being attached to arm 12 using a bolt 136 threadedly received in a threaded hole (not shown) in arm 12, although it should be recognized that a wide variety of other constructions could like-wise be used.

Figure 10:
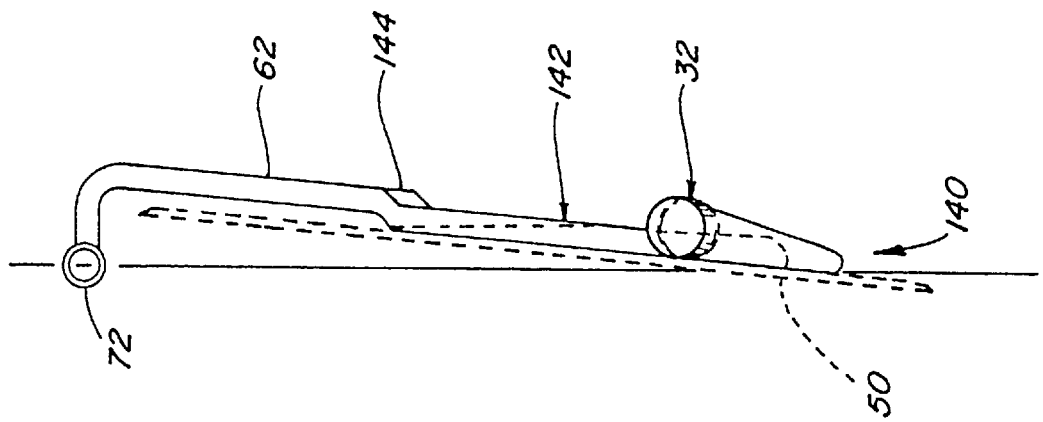
FIG. 10 is a top view of the apparatus of FIG. 9.
Figure 9:
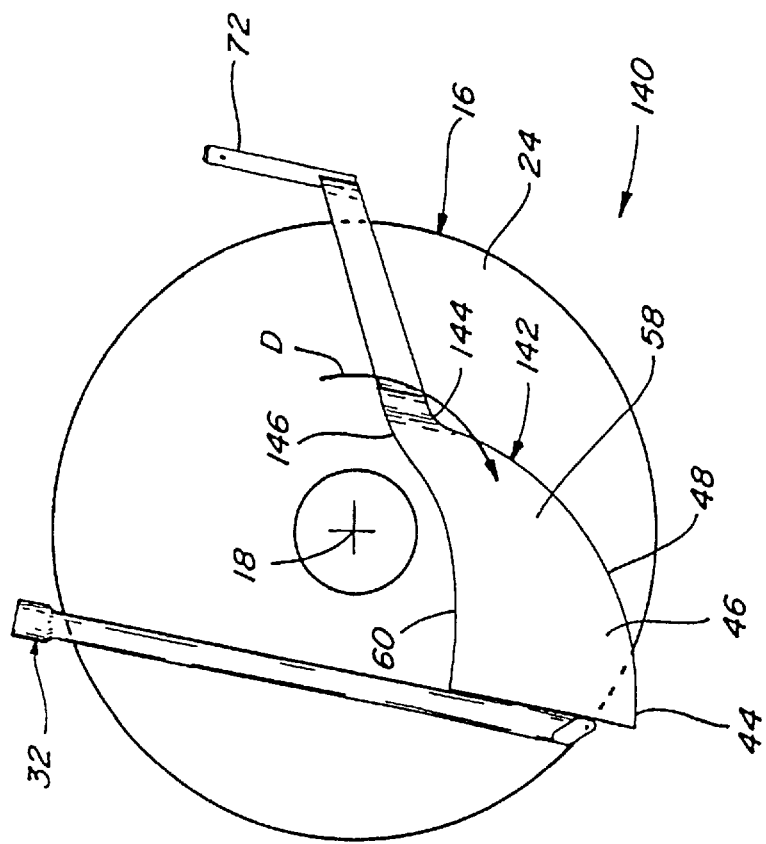
FIG. 9 is a side view of still another embodiment of material deposition apparatus according to the present invention.

Referring to FIGS. 9 and 10, still another material deposition apparatus 140 constructed and operable according to the present invention is shown, like parts of apparatus 140, apparatus 110, apparatus 96, and apparatus 10 being identified by like numerals. Apparatus 140 includes a material delivery member 32 and an integrally formed runner and support member 142 attached to material delivery member 32. Runner and support member 142 can be integrally formed in any suitable conventional manner, such as, but not limited to, by cutting or stamping a blank from metal plate or sheet stock then grinding and/or bending the blank to form a runner portion 44 having an outer surface 58 which tapers or curves through a lower portion 46 terminating at a relatively sharp leading edge portion 48. Upper end portion 60 of runner and support member 142 can be positioned for scraping engagement with rearwardly facing disk surface 24 of disk 16 when positioned therebeside as shown in FIG. 10, in lieu of the provision of a scraping edge 56 (FIG. 1), if desired. A support member 62 is integrally formed with and extends forwardly and upwardly from runner 44, terminating at a pin 72, as described above for mounting to an opener assembly, such as the opener assembly 14. As an additional preferred feature, an elbow 144 at the junction of runner portion 44 and support member 62 is oriented at a small acute angle with respect to an arc of rotation denoted by the curved arrow D, of rearwardly facing disk surface 24 about disk axis 18, such that some overlapping scraping of surface 24 is provided by a forwardmost portion 146 of upper edge portion 60 and leading edge portion 48. Material delivery member 32 and pin 72 can be attached to integrally formed runner and support member 142 in any suitable manner, such as by welding or the like. Like the runner of apparatus 10, apparatus 96, and apparatus 110, runner portion 44 of apparatus 140 has a lowermost and rearwardmost portion 50 having a centerline 94 therethrough, pin 72 being preferably located on, or on the disk side of centerline 94, for the reasons explained above.

Thus there has been shown and described several material deposition apparatus which fulfill all of the objects and advantageous sought therefor. It will be apparent to those skilled in the art, however, that many changes, modifications, variations and other uses and applications for the subject apparatus are possible and all such changes, modifications, variations and other uses and applications which do not depart from the spirit and scope of the invention are deemed to be covered by the invention which is limited only by the claims which follow.

We claim:

1. Apparatus adapted for use with an opener assembly for depositing material in a furrow formed in the ground thereby, the opener assembly including at least one disk supported for forward movement through the ground for forming the furrow, the disk being oriented at an acute angle with respect to the forward direction and having a generally rearwardly facing disk surface, said apparatus comprising:

a material delivery member having an inlet opening for receiving the material, a lower portion having an outlet opening in position for depositing the material into the furrow, and a conduit for passage of the material between the inlet opening and the outlet opening;

a runner extending forwardly from the material delivery member, the runner having a steady state position wherein a lower portion thereof will be located in the furrow beside the rearwardly facing surface of the disk; and a support member extending forwardly of the runner for mounting the runner and the material delivery member to the opener assembly separately from the disk, the support member being adapted to allow sideward movement of the runner relative to the disk and having a sufficient forward extent such that when mounted to the opener assembly during the forward movement the runner will be urged by the support member toward the steady state position.

2. The apparatus, as set forth in claim 1, wherein the support member comprises a forwardly extending arm mountable to a portion of the opener assembly at a location generally forwardly of the disk.

3. The apparatus, as set forth in claim 2, wherein the forwardly extending arm is pivotably connected to the portion of the opener assembly for sideward movement relative to the opener assembly.

4. The apparatus, as set forth in claim 3, wherein the forwardly extending arm is pivotable about a generally vertical axis which lies on a forwardly to rearwardly extending center line through the lower portion of the runner when the runner is in the steady state position.

5. Apparatus, as set forth in claim 4, wherein the lower portion of the runner has an outer surface portion located opposite the rearwardly facing surface of the disk, said outer surface portion being located in predetermined relation to said center line.

6. The apparatus, as set forth in claim 2, wherein the forwardly extending arm is a resiliently flexible member.

7. The apparatus, as set forth in claim 2, wherein the forwardly extending arm is biased toward the rearwardly facing surface of the disk.

8. The apparatus, as set forth in claim 2, wherein the forwardly extending arm is adjustable vertically relative to the opener assembly to allow adjusting a vertical position of the outlet opening of the material delivery member and the lower portion of the runner relative to the furrow.

9. The apparatus, as set forth in claim 2, further comprising a member biasing the runner toward the rearwardly facing surface of the disk.

10. Apparatus, as set forth in claim 2, wherein the arm comprises an elongated portion extending forwardly from the runner, and a shorter portion extending sidewardly from the elongated portion mountable to the portion of the opener assembly at the location generally forwardly of the disk.

11. The apparatus, as set forth in claim 1, wherein the runner is made substantially of a polymer material.

12. Apparatus, as set forth in claim 1, wherein the runner is movable away from the steady state position to allow the passage of solid items between the disk and the runner during the forward movement and, to move back to the steady state position when the solid items have passed.

13. Apparatus, as set forth in claim 1, wherein the support member is connected directly to the runner.

14. Apparatus, as set forth in claim 1, wherein the support member is connected directly to the material delivery member.

15. Apparatus, as set forth in claim 1, wherein at least the support member and the runner are integrally formed.

16. Apparatus adapted for use with an opener assembly for depositing material in a furrow formed in the ground thereby, the opener assembly including at least one disk supported for forward movement through the ground for forming the furrow, the disk being oriented at an acute angle with respect to the forward direction and having a generally rearwardly facing disk surface, said apparatus comprising:

a material delivery member having an inlet opening for receiving the material, a lower portion having an outlet opening in position for depositing the material into the furrow, and a conduit for the passage of the material between the inlet opening and the outlet opening;

a runner extending forwardly from the material delivery member having a lower portion adapted to be located in a position in the furrow beside the rearwardly facing surface of the disk; and a support member extending forwardly of the runner for mounting the runner and the material delivery member to the opener assembly separately from the disk with the outlet opening of the material delivery member in the position for depositing the material into the furrow and the lower portion of the runner in the position beside the rearwardly facing surface of the disk, the support member comprising an elongated arm portion extending forwardly from the runner and including a mounting portion located forwardly of the runner adapted for connection to a portion of the opener assembly located adjacent a forwardly located edge portion of the disk, the support member being adapted to allow sideward movement of the runner relative to the disk.

17. Apparatus, as set forth in claims 16, wherein the mounting portion is adapted for pivotal connection to the opener assembly.

18. Apparatus, as set forth in claim 16, wherein the mounting portion comprises a generally vertically extending pin cooperatively receivable in a correspondingly shaped hole in a portion of the opener assembly for connection thereto.

19. Apparatus, as set forth in claim 16, wherein the elongated arm portion is resiliently flexible so as to allow sideward movement of the runner and the material delivery member relative to the disk.

20. Apparatus, as set forth in claim 16, wherein the support member is operable when connected to the opener assembly during the forward movement thereof to urge the runner toward a steady state position beside the rearwardly facing surface of the disk.

21. An opener assembly for depositing material in a furrow formed in the ground thereby, comprising:

at least one disk supported for forward movement through the ground for forming the furrow, the disk being oriented at an acute angle with respect to the forward direction and having a generally rearwardly facing disk surface;

a material delivery member having an inlet opening for receiving the material, a lower portion having an outlet opening in position for depositing the material into the furrow, and a conduit for the passage of the material between the inlet opening and the outlet opening;

a runner extending forwardly of the material delivery member having a lower portion located beside the rearwardly facing surface of the disk; and a support member extending forwardly of the runner mounting the runner and the material delivery member to the opener assembly independently of the disk and being adapted to allow sideward movement of the runner relative to the disk, the support member comprising an elongated arm portion extending from the runner to a mounting portion located forwardly of the runner and connected to a portion of the opener assembly located adjacent a forwardly located edge portion of the disk.

22. Apparatus adapted for use with an opener assembly for depositing material in a furrow formed in the ground thereby, the opener assembly including at least one disk supported for forward movement through the ground for forming the furrow, the disk being oriented at an acute angle with respect to the forward direction and having a generally rearwardly facing disk surface, said apparatus comprising:

a material delivery member having an inlet opening for receiving the material, a lower portion having an outlet opening in position for depositing the material into the furrow, and a conduit for passage of the material between the inlet opening and the outlet opening;

a runner extending forwardly from the material delivery member, the runner having a steady state position wherein a lower portion thereof will be located in the furrow beside the rearwardly facing surface of the disk; and a support member extending forwardly from the runner for mounting the runner and the material delivery member to the opener assembly such that during the forward movement the runner will be urged by the support member toward the steady state position, the support member comprising a forwardly extending arm pivotably mountable to a portion of the opener assembly located generally forwardly of the disk for sideward movement relative to the opener assembly.

23. The apparatus, as set forth in claim 22, wherein the forwardly extending arm is pivotable about a generally vertical axis which lies on a forwardly to rearwardly extending center line through the lower portion of the runner when the runner is in the steady state position.

24. Apparatus, as set forth in claim 23, wherein the lower portion of the runner has an outer surface portion located opposite the rearwardly facing surface of the disk, said outer surface portion being located in predetermined relation to said center line.

25. Apparatus adapted for use with an opener assembly for depositing material in a furrow formed in the ground thereby, the opener assembly including at least one disk supported for forward movement through the ground for forming the furrow, the disk being oriented at an acute angle with respect to the forward direction and having a generally rearwardly facing disk surface, said apparatus comprising:

a material delivery member having an inlet opening for receiving the material, a lower portion having an outlet opening in position for depositing the material into the furrow, and a conduit for passage of the material between the inlet opening and the outlet opening;

a runner extending forwardly from the material delivery member, the runner having a steady state position wherein a lower portion thereof will be located in the furrow beside the rearwardly facing surface of the disk; and a support member extending forwardly from the runner for mounting the runner and the material delivery member to the opener assembly such that during the forward movement the runner will be urged by the support member toward the steady state position, the support member comprising a forwardly extending arm mountable to a portion of the opener assembly located generally forwardly of the disk and biased toward the rearwardly facing surface of the disk.

26. Apparatus adapted for use with an opener assembly for depositing material in a furrow formed in the ground thereby, the opener assembly including at least one disk supported for forward movement through the ground for forming the furrow, the disk being oriented at an acute angle with respect to the forward direction and having a generally rearwardly facing disk surface, said apparatus comprising:

a material delivery member having an inlet opening for receiving the material, a lower portion having an outlet opening in position for depositing the material into the furrow, and a conduit for the passage of the material between the inlet opening and the outlet opening;

a runner extending forwardly from the material delivery member having a lower portion adapted to be located in a position in the furrow beside the rearwardly facing surface of the disk; and a support member extending forwardly from the runner for mounting the runner and the material delivery member to the opener assembly with the outlet opening of the material delivery member in the position for depositing the material into the furrow and the lower portion of the runner in the position beside the rearwardly facing surface of the disk, the support member comprising an elongated arm portion extending forwardly from the runner and including a forwardly located mounting portion adapted for connection to a portion of the opener assembly located adjacent a forwardly located edge portion of the disk, wherein the mounting portion comprises a generally vertically extending pin cooperatively receivable in a correspondingly shaped hole in a portion of the opener assembly for connection thereto.

27. The apparatus, as set forth in claim 26, wherein the runner further comprises a scraping edge adapted and positioned for scraping the rearwardly facing surface of the disk during the forward movement.

* * * * *